United States Patent
Sunakawa

[11] Patent Number: 5,995,657
[45] Date of Patent: Nov. 30, 1999

[54] IMAGE PROCESSING METHOD AND APPARATUS

[75] Inventor: Shinichi Sunakawa, Asaki, Japan

[73] Assignee: Canon Kabushiki Kaisha, Tokyo, Japan

[21] Appl. No.: 08/991,636

[22] Filed: Dec. 16, 1997

[30] Foreign Application Priority Data

Dec. 16, 1996 [JP] Japan .................................. 8-352595
Nov. 28, 1997 [JP] Japan .................................. 9-328167

[51] Int. Cl.⁶ ........................................................ G06K 9/00
[52] U.S. Cl. ........................ 382/170; 382/250; 382/280; 382/281; 382/176
[58] Field of Search .................................. 382/173, 176, 382/250, 280, 281

[56] References Cited

U.S. PATENT DOCUMENTS 5,101,438  3/1992  Kanda et al. ............................ 382/176
5,828,782  10/1998  Sunakawa et al. ..................... 382/176

FOREIGN PATENT DOCUMENTS 2202771  8/1990  Japan .

OTHER PUBLICATIONS

"Image Region Separation Method Using DCT Conversion", Toru Mizuno, et al. Society for Research of the Institute of Image Electrical Engineers of Japan, pp. 7–12, Jan. 2, 1993 (with English language translation).

"DCT Encoding Method Using the Adaptive Quantization", Kazuyuki Murata, vol. 20, No. 5, The Magazine of the Institute of Image Electrical Engineers of Japan, pp. 466–475 (with English language summary), May 1991.

*Primary Examiner*—Phuoc Tran
*Attorney, Agent, or Firm*—Fitzpatrick, Cella, Harper & Scinto

[57] ABSTRACT

To improve an area cut-out ratio, a difference value between coefficients which are neighboring in an image block is calculated by a difference value calculation unit, an average value and a dispersion value of the difference value data are calculated by a distribution state calculation unit, and the average value and the dispersion value are compared with preset threshold values by a threshold value determination unit, thereby determining whether the relevant block is a character pattern area or not.

36 Claims, 12 Drawing Sheets

FIG. 4A (40)

| 5 | -135 | -52 | 4 | 36 | -141 | -19 | 15 |
|---|---|---|---|---|---|---|---|
| -176 | -139 | -40 | -50 | 29 | 110 | -7 | -41 |
| -57 | 39 | 50 | -38 | 43 | 100 | -16 | -45 |
| -105 | -115 | 1 | 27 | 20 | 74 | -13 | -25 |
| -219 | 137 | -9 | -16 | 3 | -135 | -49 | -27 |
| 104 | 190 | -44 | -53 | -42 | -1 | 32 | 9 |
| 91 | -67 | -56 | 16 | 36 | 44 | 5 | -12 |
| 31 | -9 | -9 | 10 | 4 | 13 | 7 | 0 | i ↑, j →

FIG. 4B (41)

| 171 | 4 | 12 | 46 | 7 | 31 | 12 | 26 |
|---|---|---|---|---|---|---|---|
| 119 | 100 | 10 | 12 | 14 | 10 | 9 | 4 |
| 48 | 76 | 49 | 11 | 23 | 26 | 3 | 20 |
| 114 | 22 | 8 | 11 | 17 | 61 | 36 | 2 |
| 115 | 53 | 35 | 37 | 39 | 134 | 17 | 18 |
| 13 | 123 | 12 | 37 | 6 | 43 | 27 | 3 |
| 60 | 58 | 47 | 6 | 32 | 31 | 2 | 12 | i ↑, j →

IMAGE PROCESSING METHOD AND APPARATUS

BACKGROUND OF THE INVENTION

1. Field of the Invention

The invention relates to image processing method and apparatus for cutting out a desired area by performing an orthogonal transforming process to an image and to a storage medium which is used in those image processing method and apparatus.

2. Related Background Art

Hitherto, in a device such as copying machine, OCR (Optical Character Reader), or the like, a method of converting an image into data on a space frequency base and separating a photograph image area, a dotted image area, or a character image area has been proposed.

(1) In the Record 93-01-02 of the society for research of The Institute of Image Electrical Engineers of Japan, a method of separating an image area by paying attention to a difference between a character image and a dotted image (hereinafter, this method is referred to as a first prior art) has been disclosed. According to this method, first, image data is divided into small blocks of a size of (8×8) and a DCT (Discrete Cosine Transform) process is executed. The DCT is widely used in an image encoding system such as a JPEG (Joint Photographic Experts Group) standard or the like and converts image data to data on a frequency base. Thus, as for a coefficient of each block, one row and one column indicate a DC component of the block, a column direction shows a frequency in the horizontal direction, and a row direction indicates a frequency in the vertical direction. In each of the directions, a higher frequency is shown with an increase in number of the row (column).

Subsequent to the DCT, a zigzag scanning process is executed and 2-dimensional block data is converted to 1-dimensional block data. The zigzag scanning process is also a processing method which is used in the JPEG standard or the like. As shown in FIG. 11, a scan is performed in the oblique direction from a low frequency portion to a high frequency portion. As a next step, a "zigzag rate" is calculated in accordance with the following equation (1).

$$ZigZag\_Rate[i]=ZigZag[i]\times 2-ZigZag[i-1]-ZigZag[i+1] \quad (1)$$

(where, i: 1 to 63)

Subsequently, product calculations in the low frequency portion and the high frequency portion of the zigzag rate are performed and the calculation results are set to (ZZ_Rate_moji) and (ZZ_Rate_HT), respectively. When a determining condition of the following equation (2) is satisfied, the block is decided to be a character image. When a determining condition of the following equation (3) is satisfied, the block is decided to be a dotted image. This discriminating method is realized by using a nature about the zigzag rate such that a value of the low frequency portion of a character image is large and a value of the high frequency portion of a dotted image is large.

$$ZZ\_Rate\_moji + Key \geq constant\ 1 \quad (2)$$

$$ZZ\_Rate\_HT + Key \geq constant\ 2 \quad (3)$$

Now, constants 1 and 2 are experimentally set and a value obtained by calculating a determination result of four peripheral blocks in accordance with the following equation (4) is obtained as Key. Further, "flag" in the equation (4) has a negative value if the determination result indicates the character image and has a positive value if it shows the dotted image.

$$Key = 0.25\{flag(up) + flag(left)\} + \quad (4)$$
$$0.125\{flag(two\ blocks\ left) +$$
$$flag(obliquely\ up)\}$$

(2) The processes in "The DCT encoding method using the adaptive quantization" of Vol. 20, No. 5, the magazine of The Institute of Image Electrical Engineers of Japan will now be described. It is an object of this method to prevent deterioration in character image and to improve a compression ratio of a dotted image portion by separating the character image and the dotted image and switching quantization tables of the image compression (hereinafter, this method is referred to as a second prior art).

According to the above method as well, image data is first divided into blocks of a size (8×8) and the DCT is performed. Subsequently, the sums of the absolute values of coefficients included in areas 90 to 94 shown in FIGS. 12A to 12E are calculated, respectively. When the maximum value of the sums of the coefficients in the areas 90 to 94 is larger than 90 and the maximum value of the sums of the coefficients in the areas 91 to 94 is larger than a predetermined threshold value A, the block is determined to be a dotted image. In FIG. 12F, when the sum of the absolute values of the coefficients in the area 95 is larger than a threshold value B and the block is not decided to be a dotted image block, the block is determined to be a character image block. (3) The processes in "facsimile apparatus" disclosed in JP-A-2-202771 will now be described. It is an object of this method to clarify the separation between a binary image area and a halftone image area (hereinafter, this method is referred to as a third prior art). In an image area separation parameter determination unit in this method, image data is divided into blocks of a size (4×4) and a 2-dimensional Hadamard transforming process is executed. Now, assuming that $Y_{ij}$ is a coefficient element of an Hadamard transformation, an image area separation parameter is calculated by the following equation (5).

$$L = \Sigma\Sigma yij^2 (i+j=3, 4, 5, 6) \quad (5)$$

A slice level for binarization is determined in accordance with a value of L. It is based on a theory "an energy in the transformation result which is assumed in a binary image area is larger than that of a high band of a space frequency". In other words, this means that in an area of a binary image, L has a large value and, in an area of a halftone image, L has a small value.

In the above prior arts, however, a cut-out ratio in the case where characters and a halftone image mixedly exist is low. The first and second prior arts are techniques for detecting a dotted image and have a problem such that they don't correspond to the cut-out from the halftone image. The third prior art has a problem such that an image area cannot be smoothly cut out in dependence on an image pattern. Particularly, in case of an image which was irreversibly compressed at least once, a coefficient of a high frequency portion (high band coefficient) has a low value. There is, consequently, a case where the square sum of the high band coefficients doesn't reach a threshold value and the image is not detected as characters. In case of including a character pattern of a bold line, since the coefficient is also distributed to low frequencies, a case where the image cannot be detected occurs.

SUMMARY OF THE INVENTION

The invention is made in consideration of the problems of the prior arts as mentioned above. It is the first object of the invention to provide image processing method and apparatus which can cut out an area at a high cut-out ratio irrespective of whether a background of a character pattern is a halftone image or not.

The second object of the invention is to provide a storage medium which can smoothly control the image processing method and apparatus of the invention.

To accomplish the first object, according to the invention, there is provided an image processing method comprising: an orthogonal transforming step of dividing an image and performing an orthogonal transformation; an intercoefficient difference (namely, a difference between the coefficients) detecting step of detecting a difference between coefficients which are neighboring in a block; a distribution state calculating step of calculating a distribution state in the block from detection results in the intercoefficient difference detecting step; and an area cut-out step of cutting out an area in accordance with a detection result in the distribution state calculating step.

To accomplish the first object, according to the invention, there is provided an image processing apparatus comprising: orthogonal transforming means for dividing an image and performing an orthogonal transformation; intercoefficient difference detecting means for detecting a difference between coefficients which are neighboring in a block; distribution state calculating means for calculating a distribution state in the block from detection results by the intercoefficient difference detecting means; and area cut-out means for cutting out an area in accordance with a detection result by the distribution state calculating means.

To accomplish the second object, according to the invention, there is provided a storage medium in which a program for controlling an image processing apparatus for cutting out a desired area by performing an orthogonal transforming process to an image has been stored, wherein the program has: an orthogonal transformation module for dividing an image and performing an orthogonal transformation; intercoefficient difference detection module for detecting a difference between coefficients which are neighboring in a block; distribution state calculation module for calculating a distribution state in the block from detection results by the intercoefficient difference detection module; and area cut-out module for cutting out an area in accordance with a detection result by the distribution state calculation module.

BRIEF DESCRIPTION OF THE DRAWINGS

FIGS. 4A and 4B are diagrams showing an example of an image for explaining a difference value calculating process in the image processing apparatus;

DETAILED DESCRIPTION OF THE PREFERRED EMBODIMENTS

Embodiments of the invention will now be described hereinbelow with reference to the drawings.

(a) First Embodiment

The first embodiment of the invention will be first described with reference to FIGS. 1, 2A, 2B, 3, 4A, 4B, 5A, 5B and 5C. According to the embodiment, an image is first divided into small blocks and converted into a space frequency distribution by a DCT process. Subsequently, a difference value between coefficients which are neighboring in the block is calculated and an average and a dispersion of the difference values are obtained. By comparing the average value and the dispersion value with threshold values, a process to discriminate whether the relevant block lies within a character area or not is performed.

Figure 1:
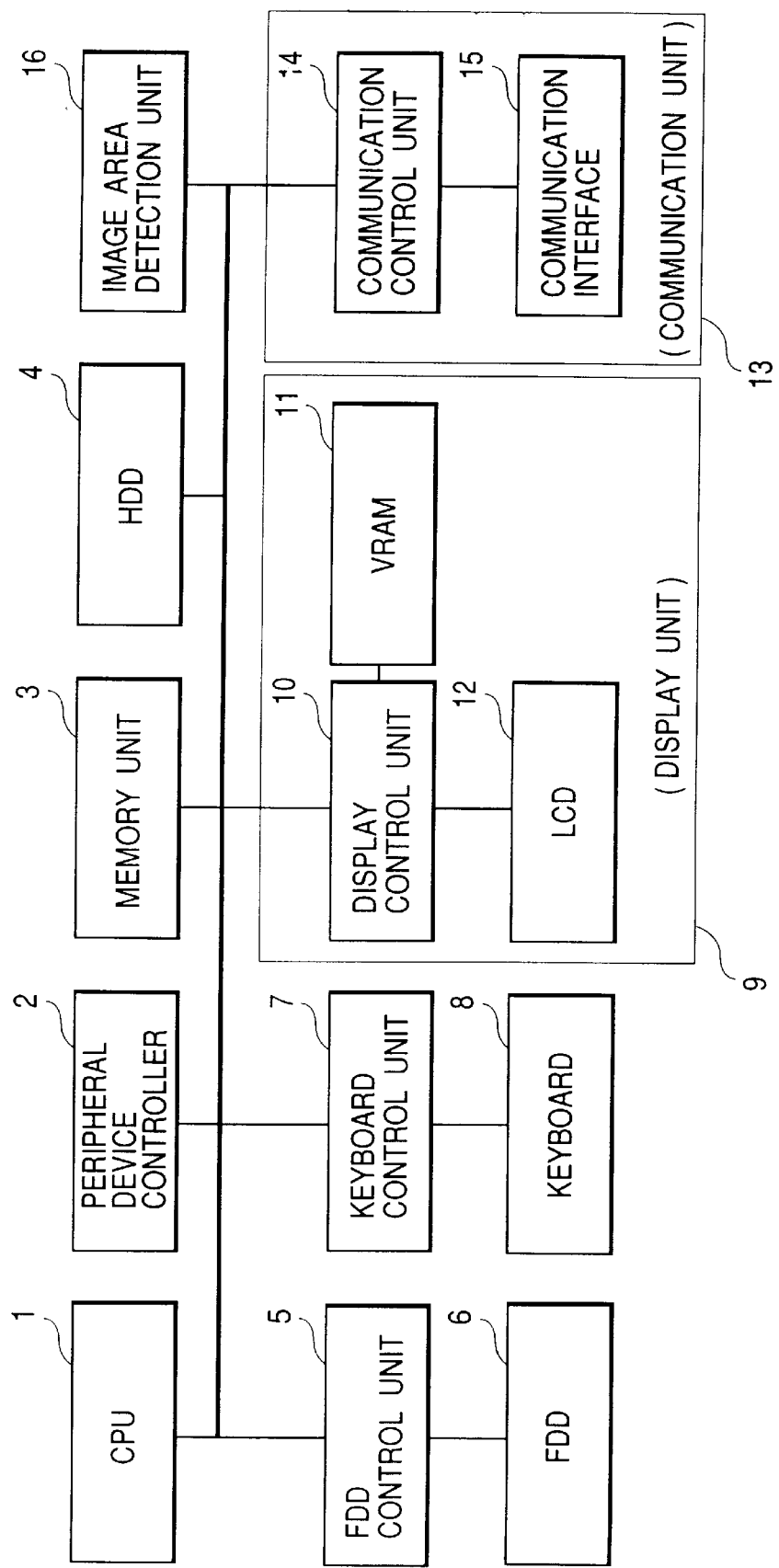
FIG. 1 is a block diagram showing a construction of an image processing apparatus according to the first embodiment of the invention.

FIG. 1 is a block diagram showing a construction of the image processing apparatus according to the first embodiment of the invention. The image processing apparatus is a personal computer having a communication unit 13 for inputting an image from the outside and a memory unit 3 for accumulating the input image and has functions for cutting out a character area from the input image, preserving the cut-out character area, and performing an image retrieval by using the preserved character area.

In FIG. 1, reference numeral 1 denotes a CPU (Central Processing Unit) for controlling the whole apparatus. The CPU 1 executes processes such as arithmetic operation, I/O (input/output) control, and the like in accordance with the program stored in the memory unit 3. Reference numeral 2 denotes a peripheral device controller which is used in a set with the CPU 1 and executes a control of I/O [serial communication, parallel communication, real-time clock, timer, interruption control, DMA (direct memory access) control, and the like] which is necessary to control the peripheral devices. Reference numeral 3 denotes the memory unit including memories such as DRAM (dynamic random access memory) serving as main storing means of the CPU 1, cache RAM (random access memory), ROM (read only memory), and the like. The memory unit 3 also serves as a work area in an image area detecting process.

Reference numeral 4 denotes a hard disk drive (HDD) for performing a setting of user data and the apparatus and a storage of image data; 5 an FDD (floppy disk drive) control unit for controlling an FDD 6; 7 a keyboard control unit for controlling a keyboard 8; 9 a display unit having a display control unit 10, a VRAM (video random access memory) 11, and a liquid crystal display panel (LCD) 12. The display control unit 10 sequentially reads out display data from the VRAM 11 and transfers the data to the LCD 12 while performing a gradation converting process and the like. The display control unit 10 executes an access from the CPU 1 to the VRAM 11 and an arbitration of the data transfer from the VRAM 11 to the LCD 12. In the embodiment, the LCD 12 displays information of various files and displays the image data.

Reference numeral 13 denotes the communication unit having a communication control unit 14 and a communication interface 15. The communication standard is based on an interface of a serial communication such as RS-232C, Ethernet, or the like, or a parallel communication such as centronics, SCSI (Small Computer System Interface), or the like. This interface inputs and outputs various data such as a text and the like and the image data. The communication standard also has an interface for inputting a television signal of the NTSC (National Television System Committee) system or the like. Reference numeral 16 denotes an image area detection unit for cutting out a character image area from the image data.

Figure 2B:
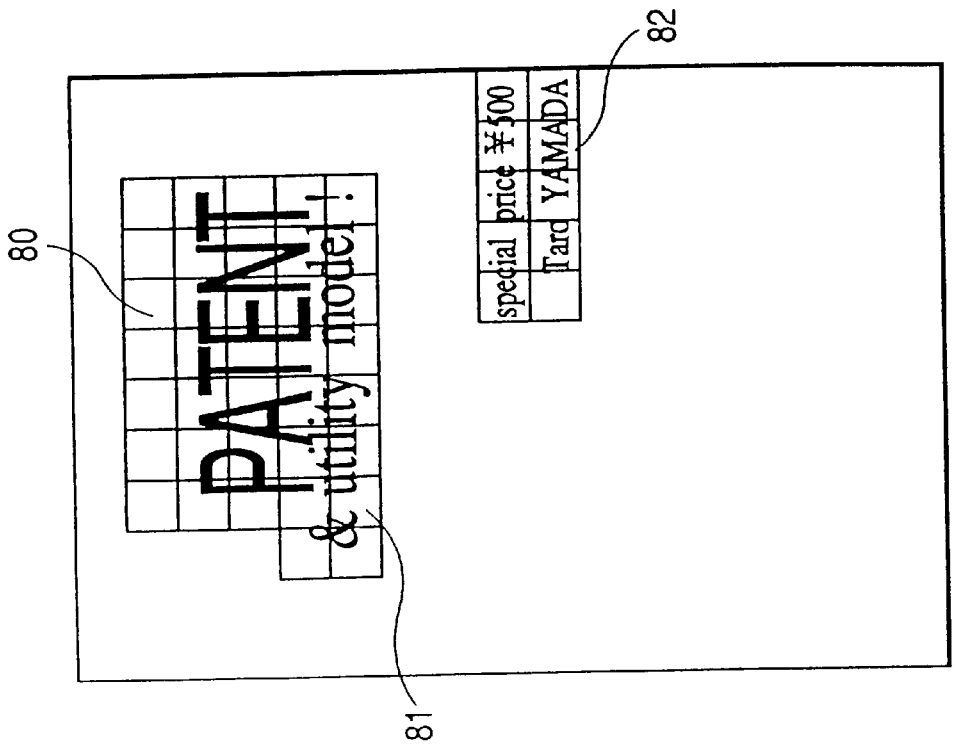
FIGS. 2A and 2B are diagrams showing an example of an image for explaining a character cut-out process in the image processing apparatus.
Figure 2A:
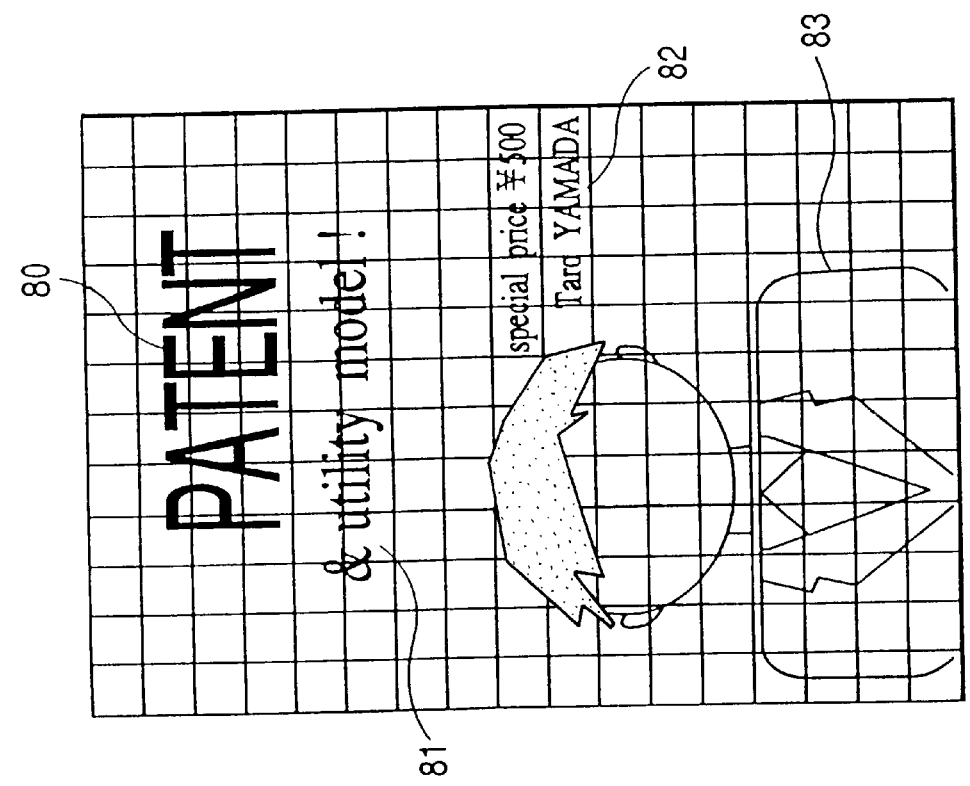

FIGS. 2A and 2B are diagrams for explaining a character cut-out state in the first embodiment. In the embodiment, processes for inputting a character image in which a photograph mixedly exists and cutting out a character image area from the input character image are executed. FIG. 2A is a diagram showing an example of a character image comprising three elements of characters 80 to 82 and a photograph 83. Each measure in the diagram shows a boundary of small blocks, which will be explained hereinlater, and is not displayed in the character image. FIG. 2B is a diagram showing a cut-out result of the character image area. Only the character image areas 81 and 82 are cut out. The processes in the embodiment are performed to form an image shown in FIG. 2B from the input image shown in FIG. 2A.

Figure 3:
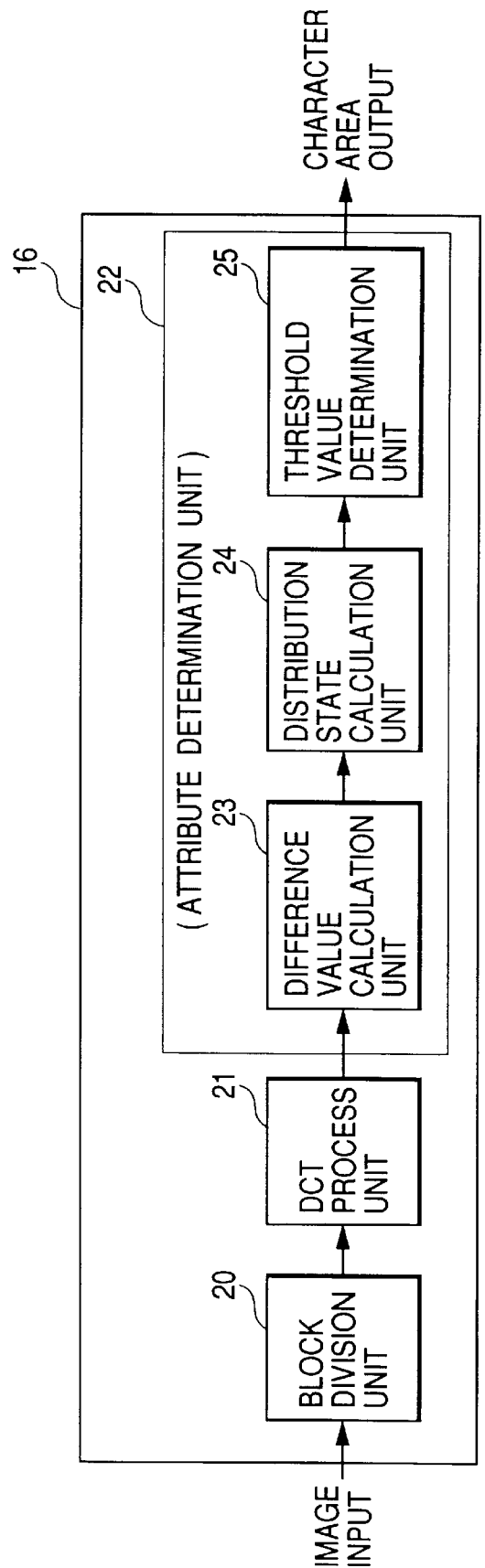
FIG. 3 is a block diagram showing a construction of an image area detection unit in the image processing apparatus.

The image area detection unit 16 will now be described with reference to FIGS. 3, 4A, and 4B. FIG. 3 is a block diagram showing a schematic construction of the image area detection unit 16. In the diagram, reference numeral 20 denotes a block division unit for dividing the image data into small blocks of a size (8×8). Reference numeral 21 denotes a DCT process unit for executing a DCT process to the small blocks divided by the block division unit 20 and converting into coefficient data on a space frequency basis. Since the block division unit 20 and DCT process unit 21 are similar to well-known techniques used in the standard such as JPEG system, MPEG (Moving Picture Experts Group) system, or the like, their detailed descriptions are omitted here.

Reference numeral 22 denotes an attribute determination unit having a difference value calculation unit 23, a distribution state calculation unit 24, and a threshold value determination unit 25. The attribute determination unit 22 executes a process for cutting out a block including a character pattern by an arithmetic operation, which will be explained hereinlater. In the embodiment, a difference between coefficients which are neighboring in the block is calculated, thereby obtaining an average value and a dispersion value of the differences. Subsequently, the average value and the dispersion value are compared with threshold values, thereby discriminating whether the relevant block lies within the character area or not.

The difference value calculation unit 23 calculates a difference value between the coefficients which are neighboring in the block. FIGS. 4A and 4B are diagrams for explaining a procedure to calculate the difference value in the difference value calculation unit 23. FIG. 4A shows an example of a coefficient distribution state in the small block. In the diagram, when a coefficient which is the i-th coefficient in the horizontal direction and the j-th coefficient in the vertical direction is shown by $x_{ij}$, difference value data $d_{ij}$ in the embodiment can be calculated in accordance with the following equation (6).

$$d_{ij}=|x_{ij}|-|x_{i-1,j}| \qquad (6)$$

(where, i=1 to 7, j=0 to 7)

A result of the calculation of the difference value data of the block in FIG. 4A is shown in FIG. 4B. As a numerical value in the diagram, the absolute value of the value of $d_{ij}$ is written.

The distribution state calculation unit 24 calculates a distribution state of the difference value data obtained by the difference value calculation unit 23. In the embodiment, the average value and the dispersion value of the difference value data are used as a distribution state. Now, assuming that the number of differential coefficients d is equal to n, an average value $\mu$ and a dispersion value $s^2$ are calculated in accordance with the following equations (7) and (8). As difference value data which is used in the calculations, the data from which $d_{00}$ as a difference between the difference value data and the DC component is eliminated is used.

$$\mu=1/n\times\Sigma d_{ij} \qquad (7)$$

$$s^2=1/(n-1)\times\Sigma(d_{ij}-\mu) \qquad (8)$$

The threshold value determination unit 25 compares the average value $\mu$ and dispersion value $s^2$ obtained by the distribution state calculation unit 24 with preset threshold values, discriminates whether the relevant block is a character pattern area or not on the basis of a comparison result, and outputs the block determined to be a character area to a file. Now, assuming that the threshold value of the average value $\mu$ is labeled as $\mu_{th}$ and the threshold value of the dispersion value $s^2$ is labeled as $s^2_{th}$, the block which satisfies the following equation (9) is decided as a character pattern area.

$$\mu>\mu_{th} \text{ and } s^2<s^2_{th} \qquad (9)$$

Figure 5C:
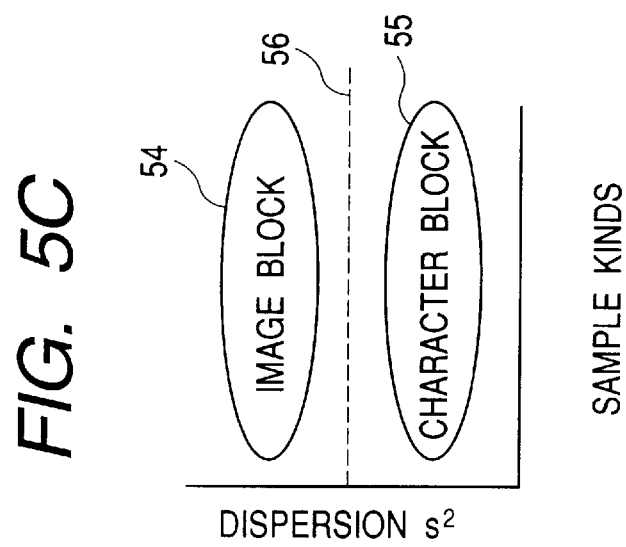
FIGS. 5A, 5B, and 5C are diagrams for explaining a principle of an attribute determining process in the apparatus.

The character area detecting operation will now be described with reference to FIGS. 5A, 5B, and 5C. FIG. 5A is a diagram showing difference value data of a halftone image block. In the diagram, an axis of abscissa indicates a space frequency and an axis of ordinate shows a difference value. Reference numeral 50 denotes a distribution of the difference value data and 51 indicates an average value of the difference value data. The image pattern has a nature such that an edge shape is generally dull and a contrast is not so high. Because of this nature, a frequency coefficient has a high value in a low band and suddenly attenuates in a high band. Therefore, it exhibits a tendency similar to that of the difference value data and has a large value in a low band and a small value in a high band. The average value 51 has an almost intermediate value between the low band portion and the high band portion.

Figure 5B:
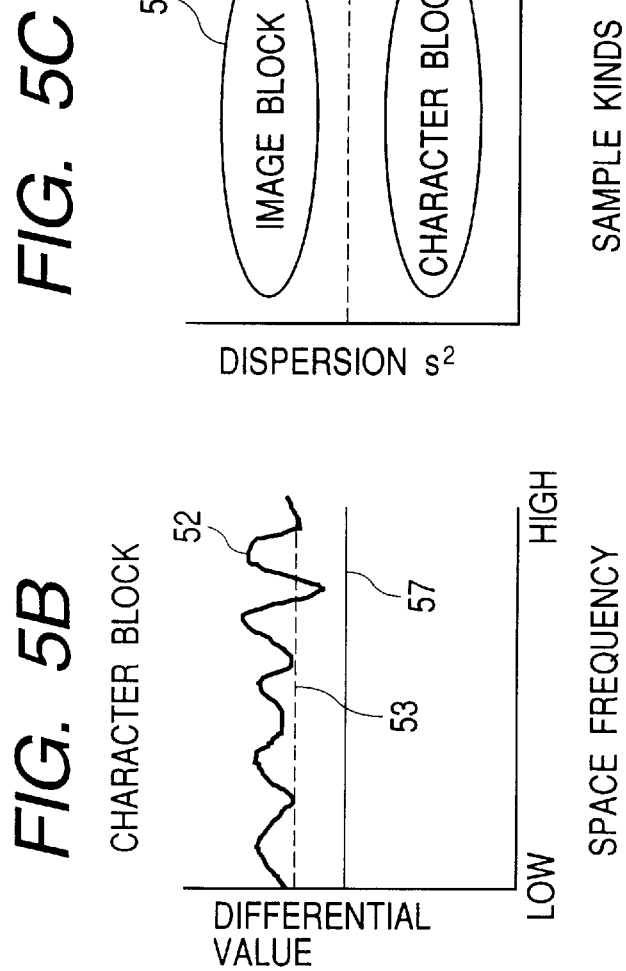
Figure 5A:
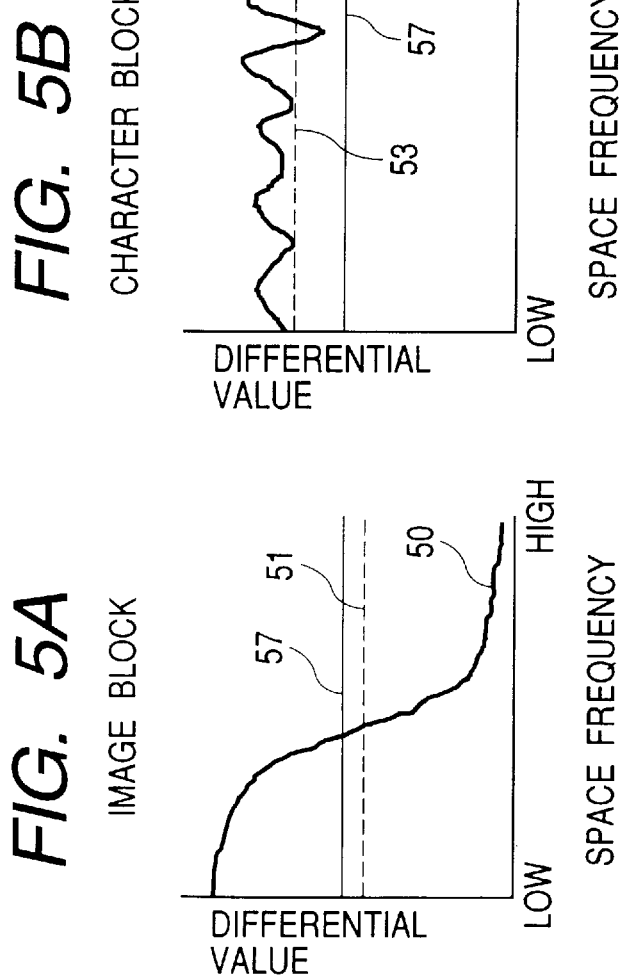

FIG. 5B is a diagram showing difference value data of a block including a character pattern. In the diagram, reference numeral 52 denotes a distribution state of the difference value data and 53 indicates an average value of the difference value data. A character pattern has a nature such that an edge shape is sharp and a contrast is high. Thus, the frequency coefficient and the difference value data have high values in the whole frequency band. The average value 53 has a high value near the difference value data 52.

Further, FIG. 5C is a diagram showing a result of a dispersion value obtained from the difference value data of FIGS. 5A and 5B. In the diagram, reference numeral 54 denotes an image block, 55 a character block, and 56 a threshold value, respectively. The image block 54 has a high dispersion value since a difference between the average value and the difference value is high. Since the difference value of the other character block 55 has a value that is almost similar to the average value in the whole frequency area, the dispersion value has a low value 56. Therefore, by determining on the basis of the threshold value, the image block 54 and character block 55 can be discriminated.

When the contrast of the whole image is low, the absolute value of the frequency coefficient is low. In this case, even in the image block, the dispersion value has a small value and there is a fear of occurrence of an erroneous cut-out. To prevent it, in the comparing conditions of the threshold value in the equation (9), a discrimination about whether the average value is equal to or larger than a set value 57 or not is added to a determination reference, thereby obtaining an accurate result.

According to the embodiment as described above, by comparing the dispersion value of the difference of the adjacent coefficients in the small block with the threshold value, influences by the compression career and the character pattern width can be eliminated and a character cut-out ratio can be improved.

(b) Second Embodiment

The second embodiment of the invention will now be described with reference to FIGS. 6, 7A, and 7B.

In the foregoing first embodiment, the difference detecting method of the adjacent coefficients in the block has been described with respect to the example where the difference value is used. In the second embodiment, however, an area is determined by using sign variations of the adjacent coefficients.

Figure 6:
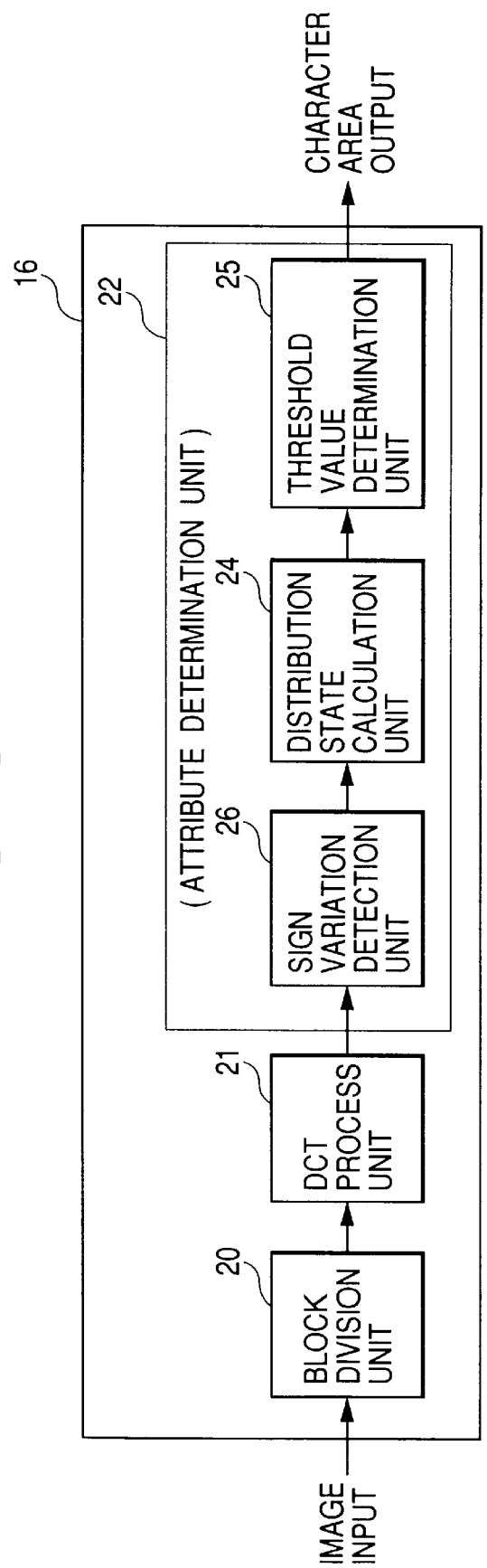
FIG. 6 is a block diagram showing a construction of the image area detection unit in the image processing apparatus according to the first embodiment of the invention.

FIG. 6 is a block diagram showing a schematic construction of an image area detection unit in an image processing apparatus according to the second embodiment of the invention. In the diagram, the same portions as those in FIG. 3 in the first embodiment are designated by the same reference numerals. FIG. 6 differs from FIG. 3 with respect to a point that a sign variation detection unit 26 is provided instead of the difference value detection unit 23 in the construction of FIG. 3. The sign variation detection unit 26 detects a coefficient whose sign is varied in the adjacent coefficients in a block.

The coefficient in the block which was DCT processed causes a sign variation from those of the adjacent coefficients in almost the whole area. As described in the first embodiment mentioned above, the character block has a nature such that the coefficient values and the difference values in the character block are high in the whole frequency area. Therefore, a similar tendency can be also detected by sampling the difference value of the sign varied portion as a representative without calculating in the whole area of the block as in the foregoing first embodiment.

In the embodiment, the sign variation detection unit 26 detects the coefficient whose sign was varied in the adjacent coefficients and calculates only the difference value between the coefficients whose signs were varied. The distribution state calculation unit 24 arranged at the post stage of the sign variation detection unit 26 determines the character block by calculating the average value and the dispersion value of the difference values. The difference value calculation in the embodiment is executed by the following equation (10) and as the number n of data when calculating the average value and the dispersion value of the difference value, the number of coefficients whose signs were varied is used.

$$d_{ij} = |x_{ij}| - |x_{i-1,j}| \quad \text{(if } x_{ij} \times x_{i-1,j} < 0), \tag{10}$$
$$d_{ij} = 0 \quad \text{(if } x_{ij} \times x_{i-1,j} \geq 0)$$

Figure 7B:
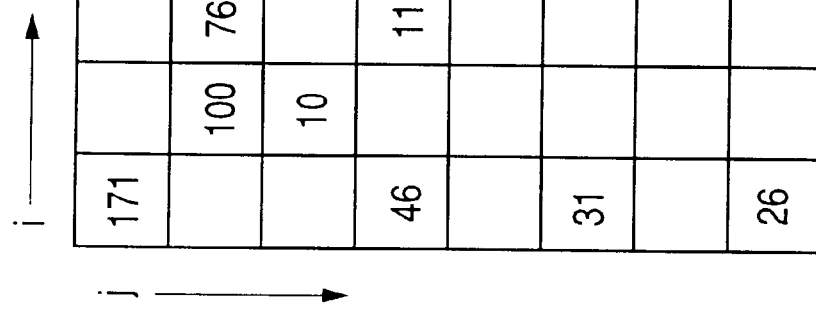
FIGS. 7A and 7B are diagrams showing an example of an image for explaining a sign variation detecting process in the image processing apparatus.
Figure 7A:
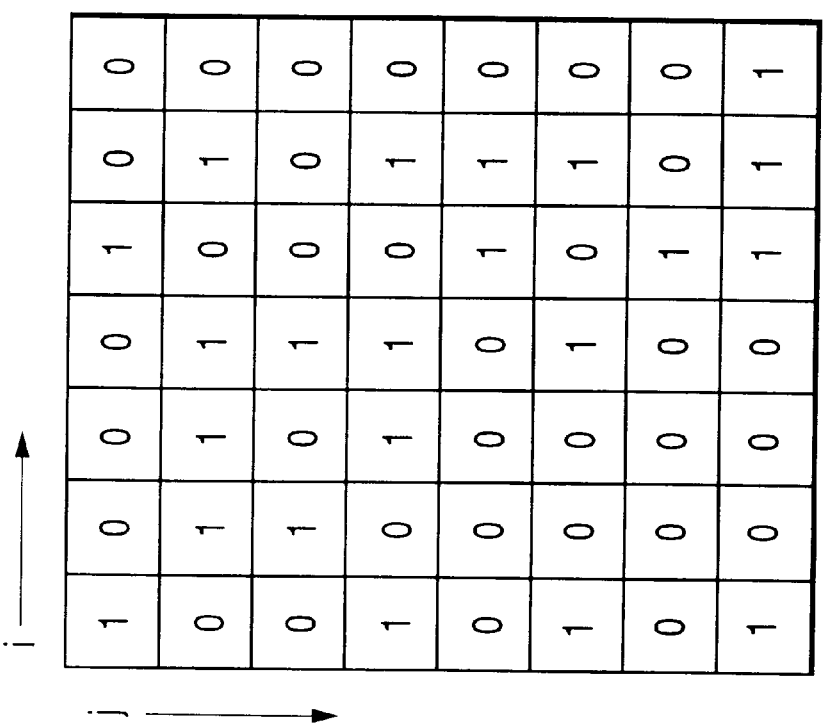

FIG. 7A is a diagram showing a result of the detection of the coefficient whose sign was varied in the adjacent coefficients in FIG. 4A showing an image block example in the foregoing first embodiment. "1" in a measure in the diagram shows a portion where there is a sign variation. "0" shows a portion where there is no sign variation. In the diagram, it will be understood that the sign variations uniformly occur in the almost whole area of the block.

FIG. 7B is a diagram showing a result of the calculation of a difference value between the coefficients whose signs were varied in FIG. 4A. By obtaining the average value and the dispersion value of the difference values by using the value of the calculation result and by comparing them with the threshold value, a character block can be extracted.

According to the embodiment as described in detail above, a cut-out result similar to that in the foregoing first embodiment can be obtained. In addition, since the number of calculations is reduced, a cut-out processing speed can be raised.

Since the other construction and operation in the embodiment are substantially the same as those in the foregoing first embodiment, their descriptions are omitted here.

The invention is not limited to only the foregoing embodiments but can be also widely applied to any other cases. For example, although the DCT has been used as an orthogonal transforming method in the above embodiments, a Fourier transformation or an Hadamard transformation can be also used in place of the DCT. Although the foregoing embodiments have been shown and described with respect to the case of calculating the difference between the absolute values of the coefficients as a method of calculating the difference value data, the invention is not limited to it. A difference value including a sign can be also calculated. Although the above embodiments have been described with respect to the example of using the difference in the horizontal direction, the invention is not limited to it. The vertical direction or both of the horizontal and vertical directions can be also used. As the number of difference value data which is used in the calculation of the distribution state, an arbitrary number can be also used. For example, the difference value data from which $d_{00}$, $d_{01}$, and $d_{10}$, of ultra-low frequencies were removed can be also used. Although the above embodiments have been shown and described as an example with respect to the case of using the average value and the dispersion value of the difference values as a distribution state detecting method, the invention is not limited to it. An arbitrary statistic or a non-statistic method can be also used. Although the above embodiments have been shown and explained as an example with respect to the case where the above method is constructed by hardware, the invention is not limited to it but can be also constructed by software. In this case, it can be easily realized by replacing the component elements in FIG. 1 by processing steps of software. Further, a sampling method of the difference value data is also not limited to that shown as an example in the foregoing embodiments. For example, any other arbitrary method such as even-number designated difference values, random sampling, or the like can be also used.

(c) Third Embodiment

Figure 8:
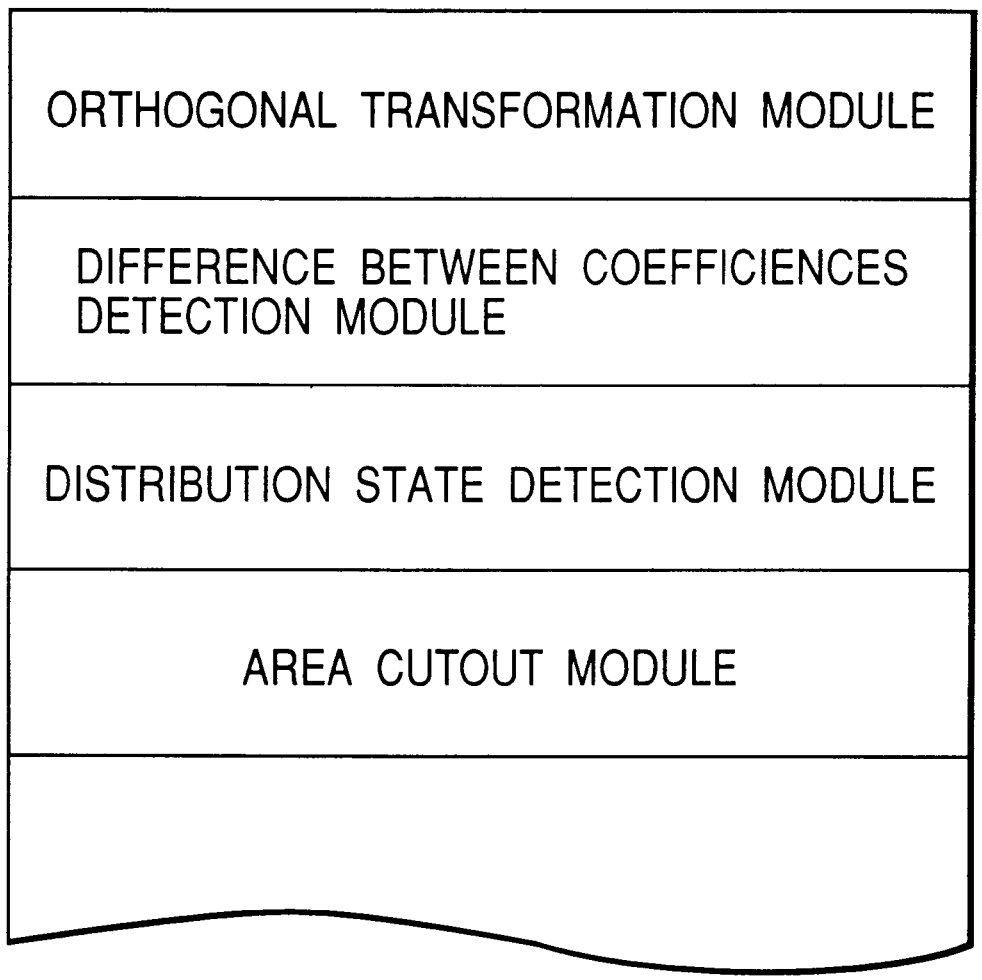
FIG. 8 is a diagram showing a program code of each module which is stored in a storage medium of the invention.

A storage medium which is used in the image processing apparatus of the invention will now be described with reference to FIG. 8. In the storage medium in which a control program to control the image processing apparatus is stored, as shown in FIG. 8, it is sufficient to store program codes of each module of at least an "orthogonal transformation module", a "difference between coefficients detection module", a "distribution state calculation module", and an "area cutout module".

The "orthogonal transformation module" is a program module to divide an image and perform an orthogonal transformation. The "difference between coefficients detection module" is a program module to detect a difference between the coefficients which are neighboring in the block. The "distribution state calculation module" is a program module to calculate a distribution state in the block from the detection results of the "difference between coefficients detection module". The "area cutout module" is a program module to cut out an area in accordance with a detection result of the "distribution state calculation module".

According to the first and second embodiments as described in detail above, by calculating the distribution value of the differences between the adjacent coefficients in the image block, an area can be stably cut out even when a character pattern and a halftone image mixedly exist. There is an effect of an improvement of an area cut-out ratio.

According to the third embodiment, there is an effect such that the foregoing image processing apparatus can be smoothly controlled.

(d) Fourth Embodiment

An example in which the character area cut-out method described in the first or second embodiment is applied to a character recognition will now be described.

Figure 9:
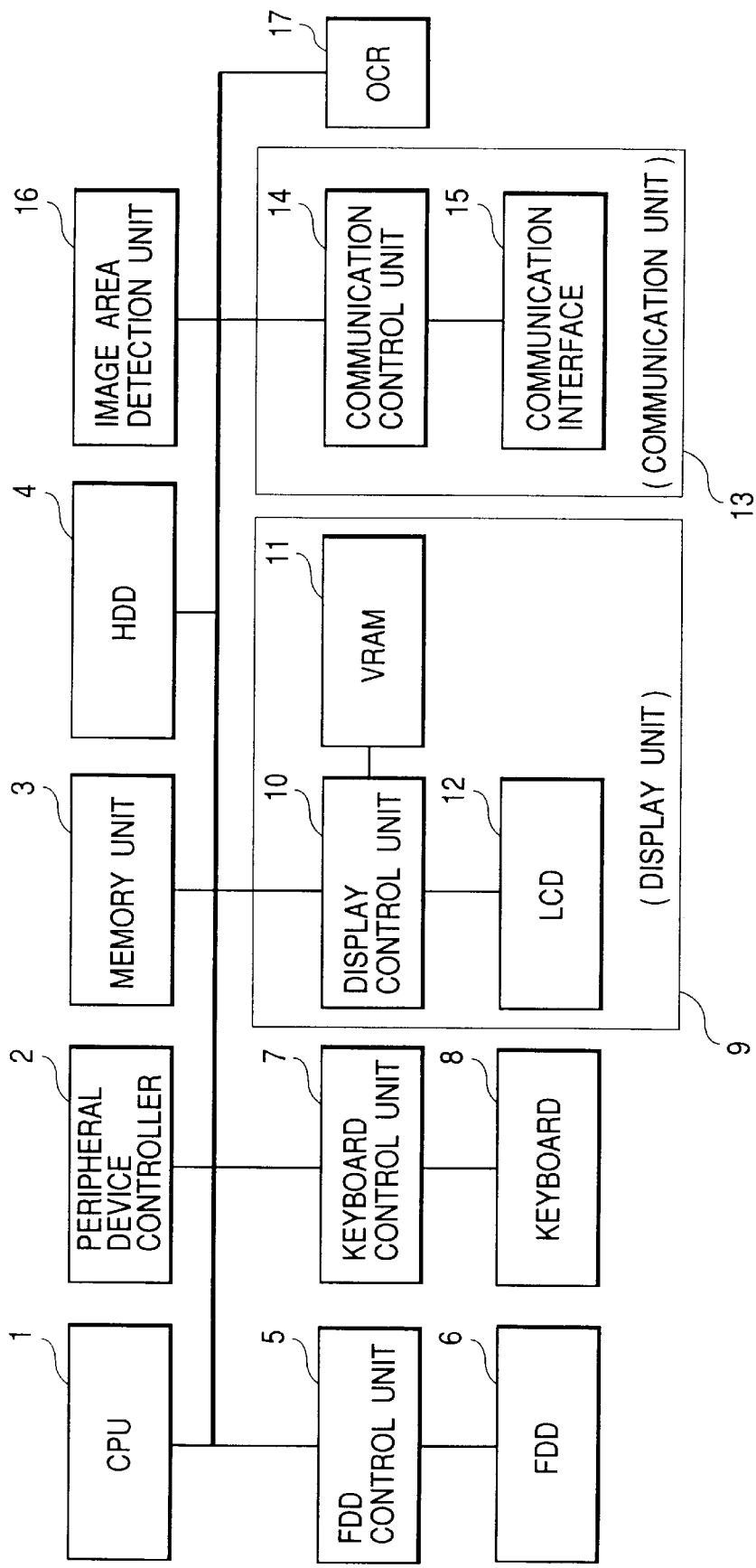
FIG. 9 is a block diagram showing a construction of an image processing apparatus according to the fourth embodiment of the invention.

An image processing apparatus according to the fourth embodiment is constructed as shown in a block diagram of FIG. 9 and differs from the block diagram of FIG. 1 with respect to only a point that an OCR 17 serving as a character recognizing apparatus is added. According to the fourth embodiment, a character area is cut out from an input image by a method similar to that in the first or second embodiment and processes such that an OCR recognition is performed by the OCR 17 to the character area which was cut out and stored in the memory unit 3 and a result of the OCR recognition is displayed and outputted to the display unit 9 are executed.

Figure 10:
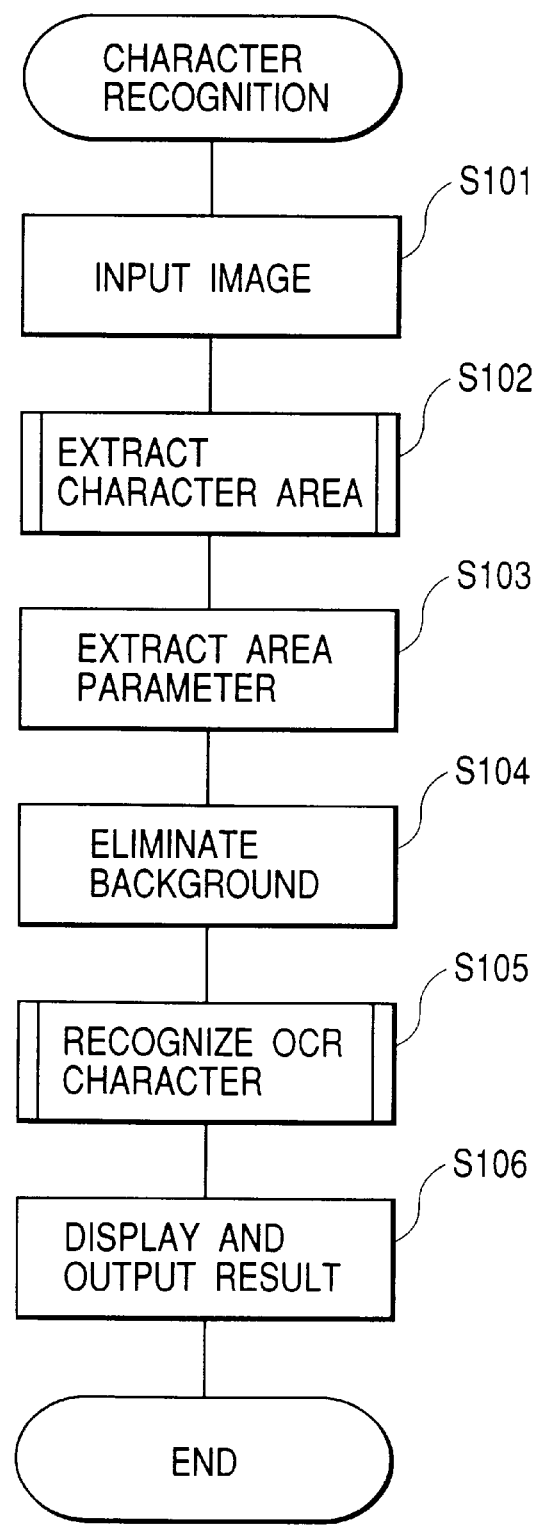
FIG. 10 is a flowchart showing a flow of a character recognizing process according to the fourth embodiment.
Figure 11:
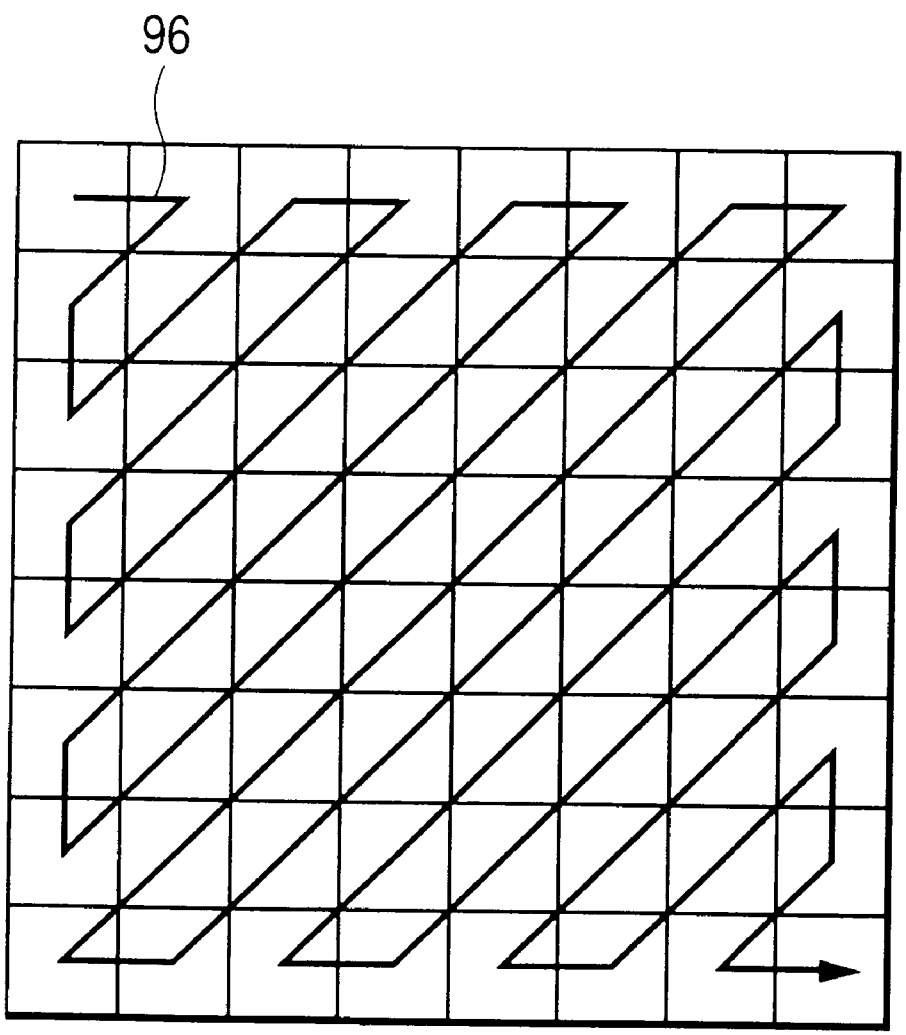
FIG. 11 is a diagram for explaining the order of a zigzag scanning process in a conventional image processing apparatus.
Figure 12A:
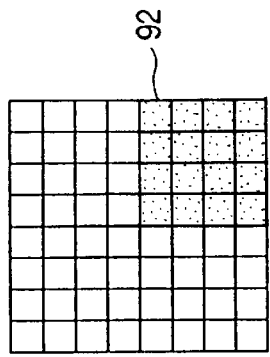
FIGS. 12A, 12B, 12C, 12D, 12E and 12F are diagrams for explaining product calculating areas of a coefficient in the conventional image processing apparatus.
Figure 12B:
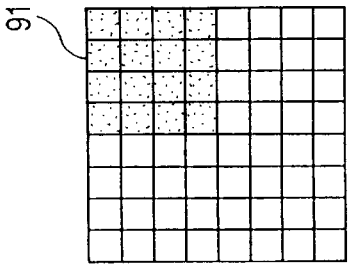
Figure 12C:
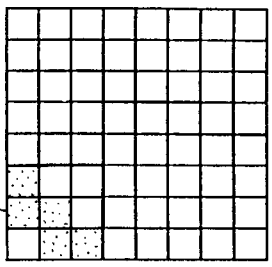
Figure 12D:
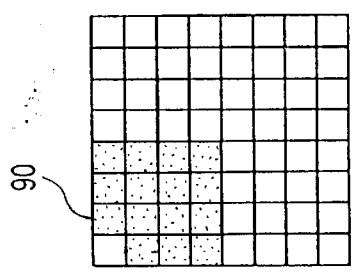
Figure 12E:
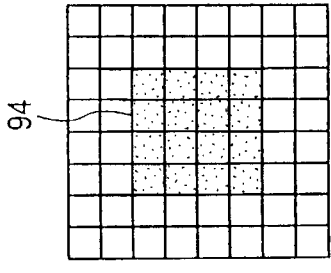
Figure 12F:
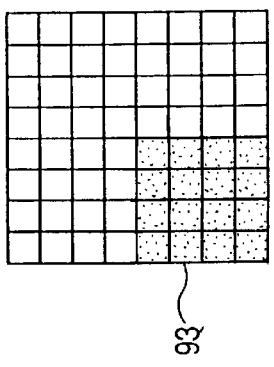

FIG. 10 is a flowchart showing a flow of a process for recognizing characters from the input image and the process will be explained with reference to the diagram.

First in step S101, an image is inputted by the communication unit 13 through a communication line. Or, an image can be inputted by an image scanner or the image data stored in the apparatus main body can be also extracted therefrom. In step S102, a character area is cut out from the image in accordance with the procedure of the first or second embodiment.

In step S103, parameters which are used in the character recognizing process are extracted from the data used in the character area cut-out process in step S103. For example, the parameters such as center position of a character in the area and color of the character are extracted. As a center position of the character, the position of a block in which a dispersive value is particularly high in a small block which was DCT processed is taken out as a candidate. As a color of the character, a hue of a block in which a dispersion value is particularly high is taken out as a candidate.

In step S104, a background is eliminated from the cut-out area. A threshold value is set by using the color and contrast difference between the character block and the image block obtained by the process in step S102. By subtracting the threshold value from the data in the character area, the background image is deleted. A well-known algorithm to delete the background can be also used.

In step S105, the character recognizing process is executed by the OCR 17. Since the process in this step can be performed by using the well-known character recognizing technique which is used in a general OCR or the like, its description is omitted here. As necessary, the candidate parameters extracted in step S103 are used. In step S106, the character recognition result is displayed to the display unit 9 or is outputted to the HDD 4. The processing routine is finished.

According to the fourth embodiment as described above, the character area cut-out method described in the first or second embodiment can be applied to the character recognition. Thus, even in a case where characters are overlapped on an image, the character recognition can be performed. Further, by executing the recognizing process on the basis of the various parameters used in the character area cut-out process, recognizing performance can be improved.

The program for the processes described in the fourth embodiment can be also stored into the storage medium as shown in the third embodiment. In this case, by inserting the storage medium into the information processing apparatus such as a computer or the like, the stored program is read out and executed.

What is claimed is:

1. An image processing method comprising:
    an orthogonal transforming step of dividing an image and performing an orthogonal transformation;
    an intercoefficient difference detecting step of detecting a difference between coefficients which are neighboring in a block;
    a distribution state calculating step of calculating a distribution state in the block from detection results in said intercoefficient difference detecting step; and
    an area cut-out step of cutting out an area in accordance with a detection result in said distribution state calculating step.

2. A method according to claim 1, wherein the orthogonal transformation is performed by using a discrete cosine transformation in said orthogonal transforming step.

3. A method according to claim 1, wherein the orthogonal transformation is performed by using an Hadamard transformation in said orthogonal transforming step.

4. A method according to claim 1, wherein the orthogonal transformation is performed by using a Fourier transformation in said orthogonal transforming step.

5. A method according to claim 1, wherein an area including a character pattern is detected in said area cut-out step.

6. A method according to claim 1, wherein a difference between the adjacent coefficients is detected in said intercoefficient difference detecting step.

7. A method according to claim 1, wherein a sign variation between the adjacent coefficients is detected in said intercoefficient difference detecting step.

8. A method according to claim 1, wherein a dispersion value of the detection results in said intercoefficient difference detecting step is calculated in said distribution state calculating step.

9. A method according to claim 1, wherein an average value of the detection results in said intercoefficient difference detecting step is calculated in said distribution state calculating step.

10. A method according to claim 8, wherein an area in which the dispersion value calculated in said distribution state calculating step is smaller than a preset threshold value is cut out as an area including a character pattern in said area cut-out step.

11. A method according to claim 9, wherein an area in which the average value calculated in said distribution state calculating step is larger than a preset threshold value is cut out as an area including a character pattern in said area cut-out step.

12. An image processing apparatus comprising:
orthogonal transforming means for dividing an image and performing an orthogonal transformation;
intercoefficient difference detecting means for detecting a difference between coefficients which are neighboring in a block;
distribution state calculating means for calculating a distribution state in the block from detection results by said intercoefficient difference detecting means; and
area cut-out means for cutting out an area in accordance with a detection result by said distribution state calculating means.

13. An apparatus according to claim 12, wherein said orthogonal transforming means executes the orthogonal transformation by using a discrete cosine transformation.

14. An apparatus according to claim 12, wherein said orthogonal transforming means executes the orthogonal transformation by using an Hadamard transformation.

15. An apparatus according to claim 12, wherein said orthogonal transforming means executes the orthogonal transformation by using a Fourier transformation.

16. An apparatus according to claim 12, wherein said area cut-out means detects an area including a character pattern.

17. An apparatus according to claim 12, wherein said intercoefficient difference detecting means detects a difference between the adjacent coefficients.

18. An apparatus according to claim 12, wherein said intercoefficient difference detecting means detects a sign variation between the adjacent coefficients.

19. An apparatus according to claim 12, wherein said distribution state calculating means calculates a dispersion value of the detection results by said intercoefficient difference detecting means.

20. An apparatus according to claim 12, wherein said distribution state calculating means calculates an average value of the detection results by said intercoefficient difference detecting means.

21. An apparatus according to claim 19, wherein said area cut-out means cuts out an area in which the dispersion value calculated by said distribution state calculating means is smaller than a preset threshold value as an area including a character pattern.

22. An apparatus according to claim 20, wherein said area cut-out means cuts out an area in which the average value calculated by said distribution state calculating means is larger than a preset threshold value as an area including a character pattern.

23. A storage medium in which a program to control an image processing apparatus for performing an orthogonal transforming process to an image and cutting out a desired area has been stored, wherein said program comprises:

an orthogonal transformation module for dividing an image and performing an orthogonal transformation;
an intercoefficient difference detection module for detecting a difference between coefficients which are neighboring in a block;
a distribution state calculation module for calculating a distribution state in the block from detection results by said intercoefficient difference detection module; and
an area cut-out module for cutting out an area in accordance with a detection result by said distribution state calculation module.

24. A storage medium according to claim 23, wherein said orthogonal transformation module executes the orthogonal transformation by using a discrete cosine transformation.

25. A storage medium according to claim 23, wherein said orthogonal transformation module executes the orthogonal transformation by using an Hadamard transformation.

26. A storage medium according to claim 23, wherein said orthogonal transformation module executes the orthogonal transformation by using a Fourier transformation.

27. A storage medium according to claim 23, wherein said area cut-out module detects an area including a character pattern.

28. A storage medium according to claim 23, wherein said intercoefficient difference detection module detects a difference between the adjacent coefficients.

29. A storage medium according to claim 23, wherein said intercoefficient difference detection module detects a sign variation between the adjacent coefficients.

30. A storage medium according to claim 23, wherein said distribution state calculation module calculates a dispersion value of the detection results by said intercoefficient difference detection module.

31. A storage medium according to claim 23, wherein said distribution state calculation module calculates an average value of the detection results by said intercoefficient difference detection module.

32. A storage medium according to claim 30, wherein said area cut-out module cuts out an area in which the dispersion value calculated by said distribution state calculation module is smaller than a preset threshold value as an area including a character pattern.

33. A storage medium according to claim 31, wherein said area cut-out module cuts out an area in which the average value calculated by said distribution state calculation module is larger than a preset threshold value as an area including a character pattern.

34. A method according to claim 1, further comprising a character recognizing step of recognizing a character in said area by using a cut-out result in said area cut-out step.

35. An apparatus according to claim 12, further comprising character recognizing means for recognizing a character in said area by using a cut-out result by said area cut-out means.

36. A storage medium according to claim 23, wherein said program further comprises a character recognition module for recognizing a character in said area by using a cut-out result by said area cut-out module.

* * * * *

UNITED STATES PATENT AND TRADEMARK OFFICE
CERTIFICATE OF CORRECTION

PATENT NO. : 5,995,657

DATED : November 30, 1999

INVENTOR(S): SHINICHI SUNAKAWA          Page 1 of 2

It is certified that error appears in the above-identified patent and that said Letters Patent is hereby corrected as shown below:

On the title page item

References Cited [56]

FOREIGN PATENT DOCUMENTS

"2202771" should read --2-202771--.

COLUMN 2

Line 32, "block. (3)" should read

--block.
        (3)--.

Line 55, "don't" should read --do not--.

Line 63, "doesn't" should read --does not--.

UNITED STATES PATENT AND TRADEMARK OFFICE
CERTIFICATE OF CORRECTION

PATENT NO. : 5,995,657
DATED      : November 30, 1999
INVENTOR(S): SHINICHI SUNAKAWA          Page 2 of 2

It is certified that error appears in the above-identified patent and that said Letters Patent is hereby corrected as shown below:

COLUMN 7

Line 27, delete "career".

Signed and Sealed this

Twenty-eighth Day of November, 2000

Attest:

Q. TODD DICKINSON

Attesting Officer          Director of Patents and Trademarks